United States Patent
Han et al.

(10) Patent No.: US 10,700,315 B2
(45) Date of Patent: Jun. 30, 2020

(54) BATTERY CASE AND REMOTE CONTROLLER INCLUDING THE SAME

(71) Applicant: SAMSUNG ELECTRONICS CO., LTD., Suwon-si (KR)

(72) Inventors: Jang-Won Han, Guri-si (KR); Eui Shik Yoon, Suwon-si (KR); In Kyu Baek, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 161 days.

(21) Appl. No.: 15/843,095

(22) Filed: Dec. 15, 2017

(65) Prior Publication Data

US 2018/0183022 A1 Jun. 28, 2018

(30) Foreign Application Priority Data

Dec. 27, 2016 (KR) ........................ 10-2016-0179653

(51) Int. Cl.
*H01M 2/10* (2006.01)
*H04N 5/44* (2011.01)

(52) U.S. Cl.
CPC ...... *H01M 2/1055* (2013.01); *H01M 2220/30* (2013.01); *H04N 5/4403* (2013.01); *H04N 2005/4405* (2013.01)

(58) Field of Classification Search
None
See application file for complete search history.

(56) References Cited

U.S. PATENT DOCUMENTS

| | | | | |
|---|---|---|---|---|
| 3,445,297 A | * | 5/1969 | Sidell | G04C 10/00 429/98 |
| 4,031,295 A | * | 6/1977 | Rigazio | H01M 2/1055 429/100 |
| 2002/0076607 A1 | * | 6/2002 | Chang | H01M 2/1066 429/100 |
| 2004/0196621 A1 | * | 10/2004 | Nakamura | H01H 9/0235 361/679.01 |
| 2008/0063928 A1 | | 3/2008 | Lin | |

FOREIGN PATENT DOCUMENTS

| | | |
|---|---|---|
| JP | 10-144274 A | 5/1998 |
| JP | 2007-042537 A | 2/2007 |
| JP | 4471623 B2 | 6/2010 |
| KR | 20-1990-0001657 U | 1/1990 |
| KR | 1998010287 U | 5/1998 |
| KR | 20-0154484 Y1 | 8/1999 |

OTHER PUBLICATIONS

International Search Report dated Apr. 10, 2018, issued by the International Searching Authority in International Application No. PCT/KR2017/014725 (PCT/ISA/210).
Communication dated Dec. 6, 2019, issued by the European Patent Office in counterpart European Patent Application No. 17886389.0.

* cited by examiner

*Primary Examiner* — Alix E Eggerding
(74) *Attorney, Agent, or Firm* — Sughrue Mion, PLLC

(57) ABSTRACT

A battery case from which a battery is easily separated and a remote controller including the same are provided. The battery case includes a body including a battery container and a pressing member installed in the battery container and configured to press the batteries in response to the batteries are being from the body.

20 Claims, 16 Drawing Sheets

BATTERY CASE AND REMOTE CONTROLLER INCLUDING THE SAME

CROSS-REFERENCE TO RELATED APPLICATION

This application claims priority from Korean Patent Application No. 10-2016-0179653, filed on Dec. 27, 2016 in the Korean Intellectual Property Office, the disclosure of which is incorporated herein by reference.

BACKGROUND

1. Field

Exemplary embodiments relate to a battery case from which a battery is easily separated and a remote controller including the same.

2. Description of the Related Art

In general, most household appliances are provided with a remote controller capable of wirelessly controlling the household appliance within a predetermined distance.

Due to the development of technology, the use of remote controllers in everyday life is gradually increasing, and accordingly, the remote controllers have become an essential household appliance element in a home.

A battery for supplying power can be mounted in a remote controller. Since a battery is discharged and unable to act as a power supply when used for a predetermined time, the battery must be replaced with a new battery or recharged by a charger to be reused.

Accordingly, the battery can be detachably installed in a body or a case of the remote controller or the like.

SUMMARY

One or more exemplary embodiments provide a battery case having an improved structure to allow easy replacement of a battery, and a remote controller including the same.

One or more exemplary embodiments also provide a battery case with improved usability and stability, and a remote controller including the same.

In accordance with an aspect of an exemplary embodiment, a battery case includes: a body having a battery container; and a pressing member installed in the battery container and configured to press a battery in response to the battery being separated from the body.

The pressing member may be detachably installed on at least one edge of the battery container.

The pressing member may include a presser configured to press at least one side of the battery.

The pressing member may include a rotary shaft and a button part extending toward one side of the rotary shaft; and the presser may be configured to be moved by pressing of the button part.

The body may further include a cover configured to cover the battery container and an elastic member configured to move the pressing member in response to the cover being separated from the body.

The battery may include a cylindrical battery; and the presser may include a curved surface corresponding to the battery.

The battery container may include a pressing member installer on which the pressing member is detachably mounted.

The pressing member installer may include: a presser installer configured to accommodate the presser; a button part installer connected to the presser installer and formed to be open to accommodate the button part; and a rotary shaft supporter configured to support the rotary shaft.

The pressing member installer may include a separation prevention part configured to prevent separation of the pressing member.

The battery container may include a first connection terminal provided to come into contact with one end of the battery, and a second connection terminal provided to come into contact with another end of the battery and having elasticity.

The pressing member may be eccentrically disposed nearer the first connection terminal than the second connection terminal.

In accordance with an aspect of another exemplary embodiment, a remote controller includes: a body having a battery container configured to accommodate a battery; a case configured to cover the battery container; and a pressing member installed in the battery container and configured to press the battery in response to the case being separated from the body.

The body may be configured to slide from the case.

The battery container may further include an elastic member configured to move the pressing member.

The pressing member may include: a rotary shaft; a button part extending toward one side of the rotary shaft; and a presser extending to another side of the rotary shaft and configured to be moved by the button part.

The battery may include a cylindrical battery; and the presser may include a contact surface in a curved surface shape corresponding to the battery.

The pressing member may be detachably installed on at least one edge of the battery container.

The battery container may include a pressing member installer on which the pressing member is detachably installed; and the pressing member installer may include a separation prevention part configured to prevent separation of the pressing member.

The battery container may include: a first connection terminal configured to come into contact with a first end of the battery; and a second connection terminal configured to come into contact with a second end of the battery and having elasticity.

The presser may be disposed nearer the second connection terminal than the first connection terminal.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
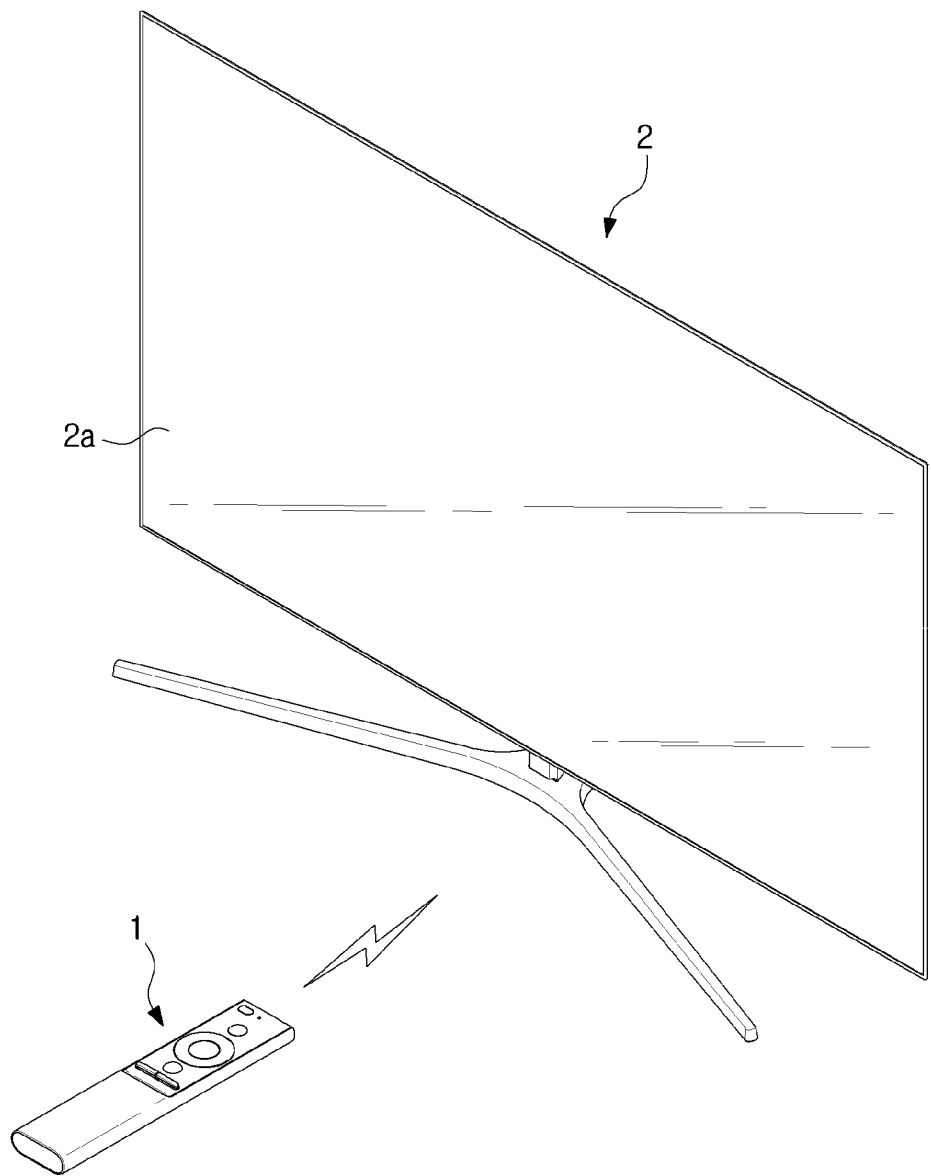
FIG. 1 is a perspective view illustrating a remote controller of a display device according to one exemplary embodiment.

Embodiments described in the specification and configurations shown in the accompanying drawings are merely examples, and various modifications may replace the embodiments and the drawings when the present application is submitted.

Further, identical symbols or numbers in the drawings denote components or elements configured to perform substantially identical functions.

Further, terms used herein are only for the purpose of describing particular embodiments and are not intended to limit to the present disclosure. As used herein, the singular forms "a," "an," and "the" are intended to include the plural forms as well, unless the context clearly indicates otherwise. It should be further understood that the terms "include," "including," "have," and/or "having" specify the presence of stated features, integers, steps, operations, elements, components, and/or groups thereof, but do not preclude the presence or addition of one or more other features, integers, steps, operations, elements, components, and/or groups thereof.

Further, it should be understood that, although the terms "first," "second," etc. may be used herein to describe various elements, the elements are not limited by the terms, and the terms are only used to distinguish one element from another. For example, a first element could be termed a second element, and similarly, a second element could be termed a first element without departing from the scope. As used herein, the term "and/or" includes combinations of one or all of a plurality of associated listed items.

Hereinafter, exemplary embodiments will be described in detail with reference to the accompanying drawings. The present disclosure is applicable to all products including batteries provided to supply power thereto. For example, a remote controller, a radio, a two-way radio, a clock, and the like may be included in the products. An example of a remote controller provided to control a display device will be described below.

A front surface and a frontward direction, when used below, refer to a longitudinal direction of a remote controller 1 shown in FIG. 1, and a rearward direction refers to a direction toward a rear side of the remote controller 1.

Figure 2:
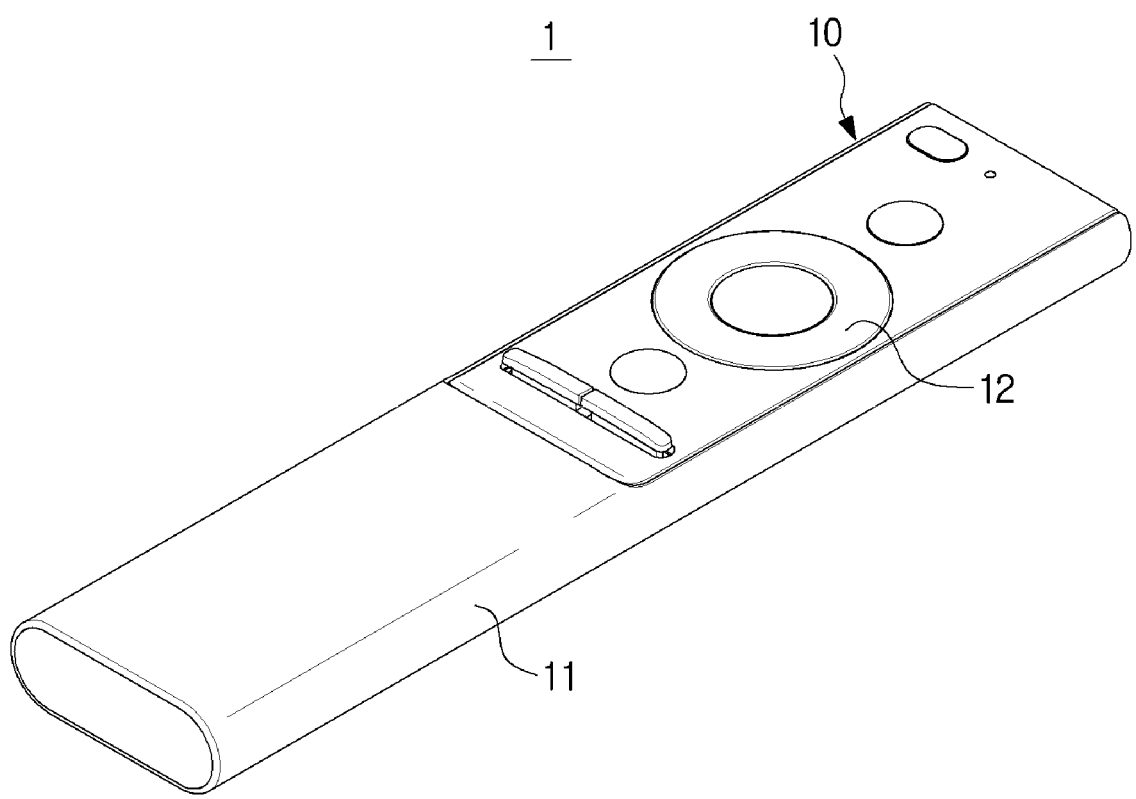
FIG. 2 is a perspective view illustrating the remote controller according to an exemplary embodiment.
Figure 3:
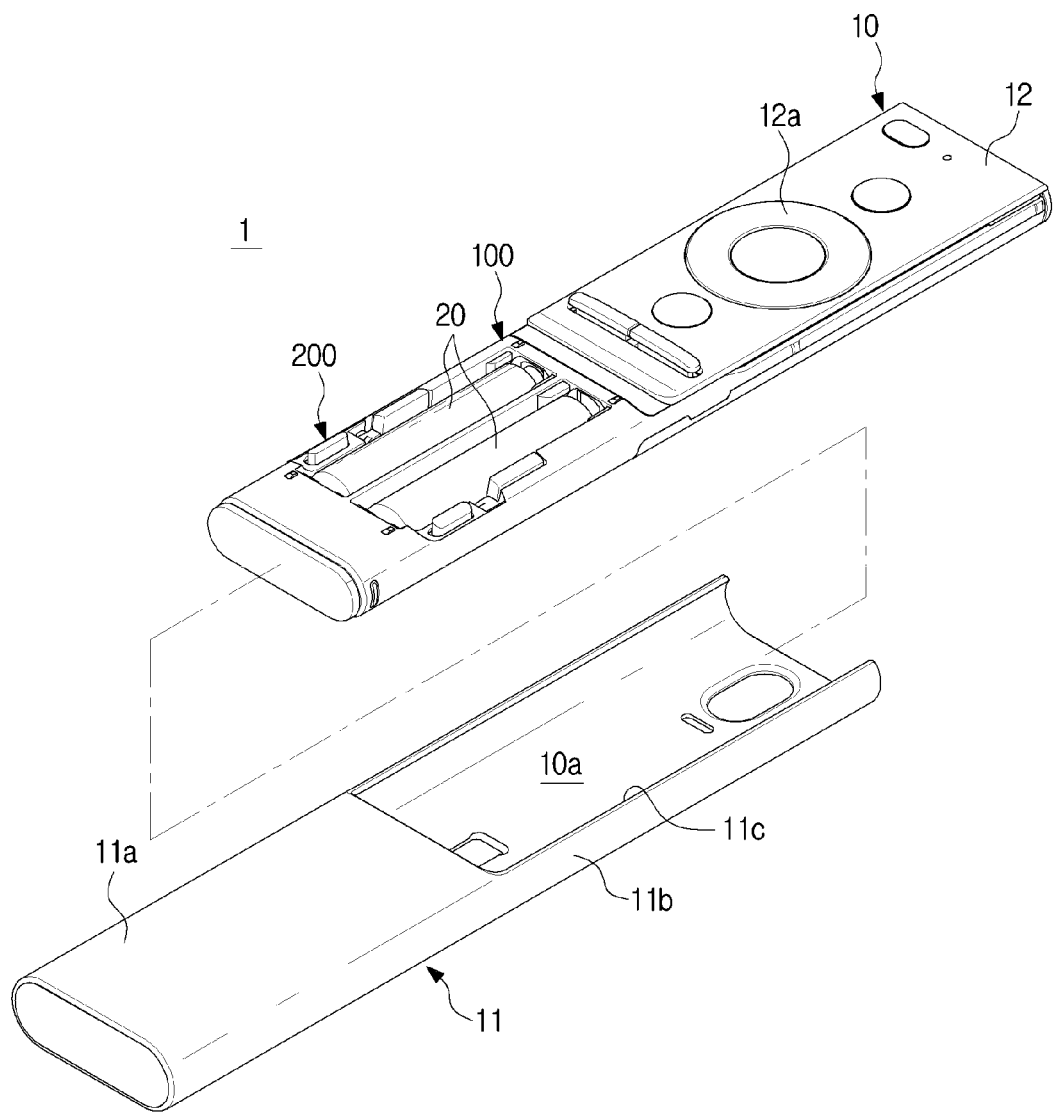
FIG. 3 is an exploded perspective view illustrating a battery case of the remote controller according to an exemplary embodiment.

FIG. 1 is a perspective view illustrating a remote controller of a display device according to an exemplary embodiment, FIG. 2 is a perspective view illustrating the remote controller according to an exemplary embodiment, and FIG. 3 is an exploded perspective view illustrating a battery case of the remote controller according to an exemplary embodiment.

As shown in FIGS. 1 to 3, a display device 2 may include a display part 2a configured to display image information. In general, two glass substrates, which are a TFT substrate and a color substrate, and a liquid crystal layer formed by injecting liquid crystals between the two glass substrates form a display panel of the display part 2a. The display part 2a may include a power supply unit configured to supply power for driving the display panel and a driving mode for converting an electrical signal, which is provided from the outside, into an image, a sound, or the like.

The remote controller 1 may transmit a display control signal to the display device 2 through short-range wireless communication. To this end, the remote controller 1 and the display device 2 may perform control data exchange. The above-described short-range wireless communication may be Bluetooth communication, but is not limited thereto.

Although the example of the remote controller 1 configured to control the display device 2 is illustrated, embodiments are not limited thereto. For example, the remote controller 1 may control a device having a function of outputting an image, such as a set-top box, a monitor, a projection, a large format display (LFD), or the like, and various devices, which may be controlled by the remote controller 1, other than the above-described devices are possible as examples.

In an exemplary embodiment, the remote controller 1 may include a body 10 in which a control button 12a and the like are provided, a cover 11 provided to form an exterior of the body 10.

The body 10 may be formed in a rectangular parallelepiped shape. The control button 12a operated by a manipulation of a user may be provided on a front surface of the body 10. The control button 12a may include one or more control buttons. The control button 12a may form a controller 12. The controller 12 may be located on an upper front surface of the body 10. The controller 12 may include a printed circuit board (not shown). The printed circuit board may be provided under the control button 12a.

Although the example of the control button 12a is shown as a button provided to be deformed by a press of a user, embodiments are not limited thereto. For example, the button may include such as a touch button, a rotary knob, a tilt switch, and the like.

The body 10 may include a synthetic resin material (for example, plastic or the like) or a metal material. The body 10 may be formed of a synthetic resin material with a small amount of a metal material or a metal material with a small amount of a synthetic resin material.

The cover 11 is provided to cover the body 10. The cover 11 may be provided to cover at least a part of the body 10. The cover 11 may be formed of a metal material (for example, aluminum, magnesium, or the like). The cover 11 formed of the metal material can improve durability and an aesthetic exterior of the remote controller 1.

As shown in FIG. 3, the cover 11 may include a first surface portion 11a configured to cover at least a part of the front surface of the body 10, and a second surface portion 11b configured to cover both side surfaces and a rear surface of the body 10. The first surface portion 11a and the second surface portion 11b are integrally formed.

At least a part of the cover 11 may be open to form a body installation portion 11c. The body installation portion 11c may be formed to allow the body 10 to be inserted into a body container 10a. The body installation portion 11c may be formed in one end portion of the cover 11. The body 10 inserted through the body installation portion 11c may be accommodated in the body container 10a of the cover 11.

The body 10 may be inserted into the body installation portion 11c of the cover 11 and may be attached to or detached from the cover 11. The body 10 may be slidably coupled to the cover 11 through the body installation portion 11c.

A hook protrusion 18 (see FIG. 11) may be formed on the rear surface of the body 10. A hook part 15 (see FIG. 4) may be provided in the second surface portion 11b of the cover 11 to be engaged with the hook protrusion 18 of the body 10. The hook part 15 may be formed to prevent the body 10 from being completely separated from the cover 11 when the body 10 is separated from the cover 11. The hook part 15 is provided to maintain a state in which the body 10 is temporarily assembled with the cover 11. The hook part 15 may include a first hook part 15a and a second hook part 15b formed to be spaced apart from the first hook part 15a. The first hook part 15a is disposed to be spaced a predetermined distance from the second hook part 15b, and the hook protrusion 18 engaged with the first hook part 15a may be engaged with the second hook part 15b by pulling and moving the body 10 by a force of a user. In an embodiment, although the example of the hook part 15 is shown as a groove, embodiments are not limited thereto. The hook part 15 may further include a slit or hole.

Since the hook protrusion 18 of the body 10 is engaged with the second hook part 15b, the body 10 may be prevented from being completely separated from the cover 11.

Further, in addition to the hook protrusion 18, a separation button 17B (see FIG. 10) may be formed on the rear surface of the body 10 such that the body 10 may be separated from the cover 11. The separation button 17B is coupled to a separation hole 16 of the cover 11. The user presses the separation button 17B to separate the body 10 from the separation hole 16, and accordingly, the body 10 may be separated from the cover 11.

A configuration and operation of separating the body 10 from the cover 11 will be described below.

A battery case 100 in which batteries 20 configured to supply power are accommodated is provided in the body 10. The battery case 100 may be provided in the body 10. The battery case 100 may be integrally formed with the body to be recessed in an inner lower portion of the body 10. Although the example of the battery case 100 integrally formed with the body 10 is illustrated, embodiments are not limited thereto. For example, the battery case 100 may be provided as a separate component, and may be inserted into a space in which the battery case 100 is formed to be recessed inward from the body 10 and coupled to the battery case 100.

The battery case 100 includes a battery container 110 configured to accommodate the batteries 20. The battery container 110 may be formed in the battery case 100. The battery case 100 may be formed in a state in which one surface thereof is open so that the batteries 20 accommodated in the battery container 110 may be attached to and detached from the battery case 100. The battery case 100 may be formed in a state in which an upper surface thereof is open so that the batteries 20 accommodated in the battery container 110 are attached to and detached from the battery case 100.

The battery case 100 may be disposed in a lower portion of the body 10. The open upper surface of the battery case 100 may be covered by the first surface portion 11a of the cover 11. Although the example of the battery case 100 covered by the cover 11 inserted into and coupled to the body 10 is illustrated, embodiments are not limited thereto. For example, the battery case 100 may further include a separate cover member coupled to and covering the open upper surface of the battery case 100.

Figure 4:
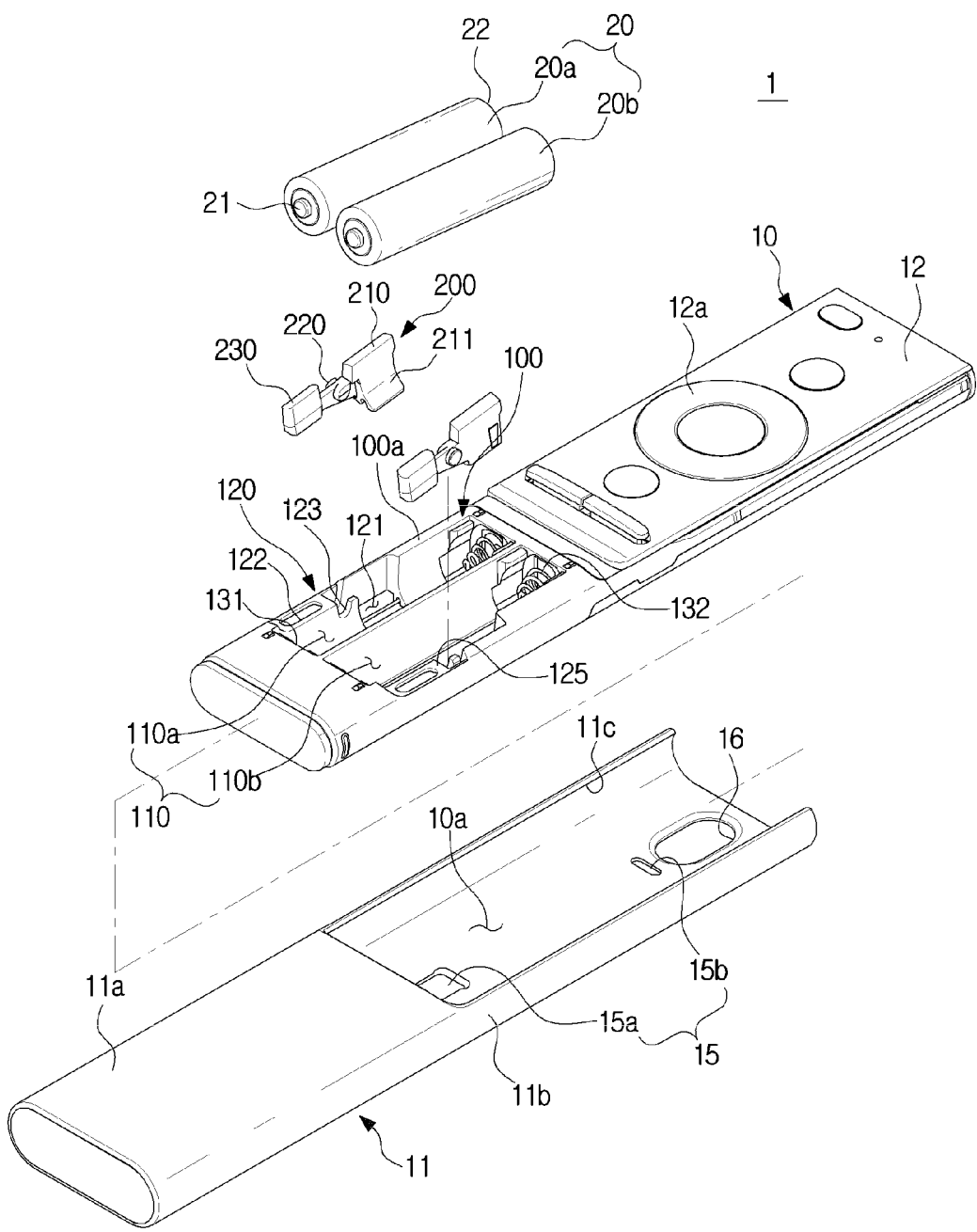
FIG. 4 is an exploded perspective view illustrating a remote controller in which pressing members are installed in the battery container according to an exemplary embodiment.

The batteries 20 are provided to supply power. As shown in FIG. 4, the battery 20 may include a cylindrical battery 20 having a predetermined diameter and length according to the international standard. The battery 20 may include a AA type battery or a AAA type battery. Although the example of the battery 20 including a pair of the first battery 20a and the second battery 20b is illustrated, embodiments are not limited thereto.

Further, although the example of the battery 20 is shown as the cylindrical battery, embodiments are not limited thereto. For example, the battery 20 may include a battery in a rectangular shape or a disk shape.

Pressing members 200 provided to press the batteries 20 when the batteries 20 are separated from the battery case 100 may be installed in battery case 100. The pressing members 200 may be provided in the battery container 110 of the battery case 100.

Figure 5:
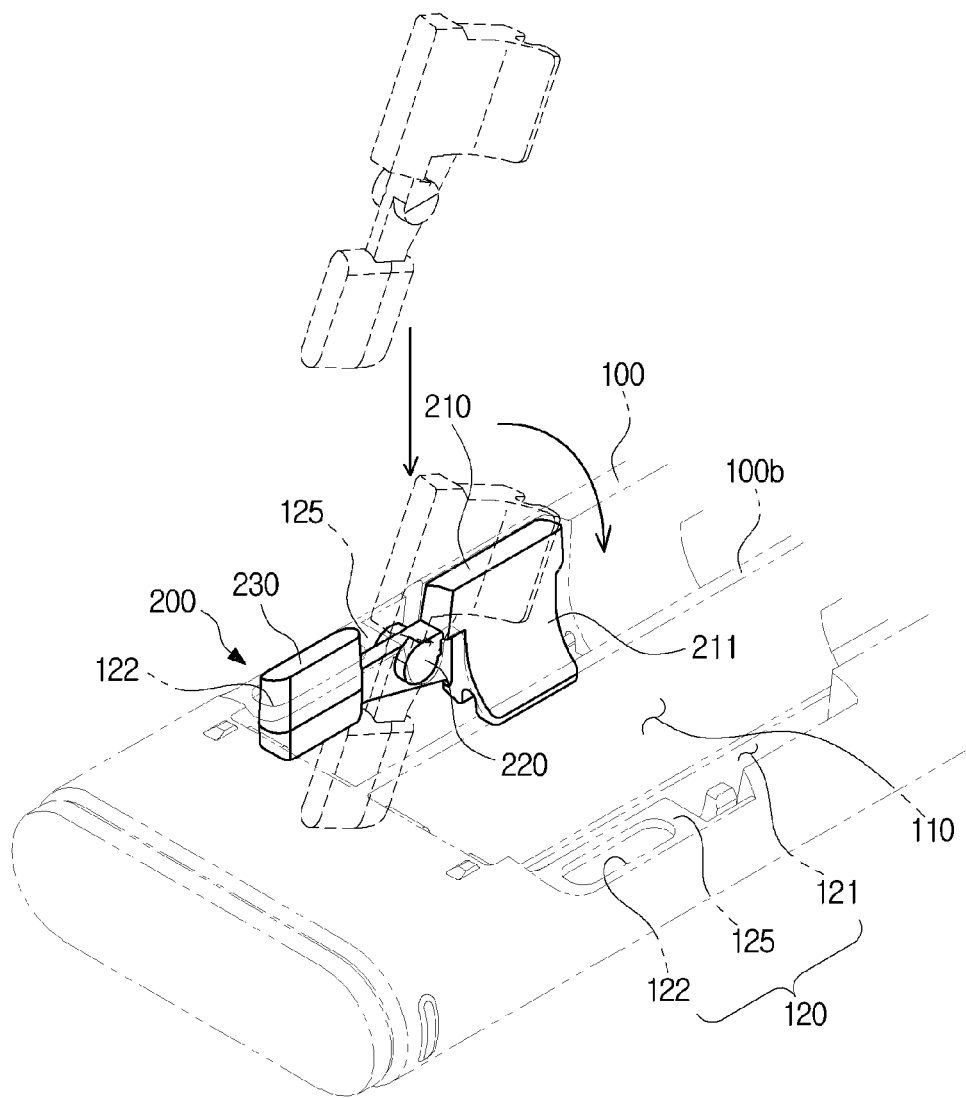
FIG. 5 is a perspective view illustrating installation of the pressing members in the battery container according to an exemplary embodiment.
Figure 6:
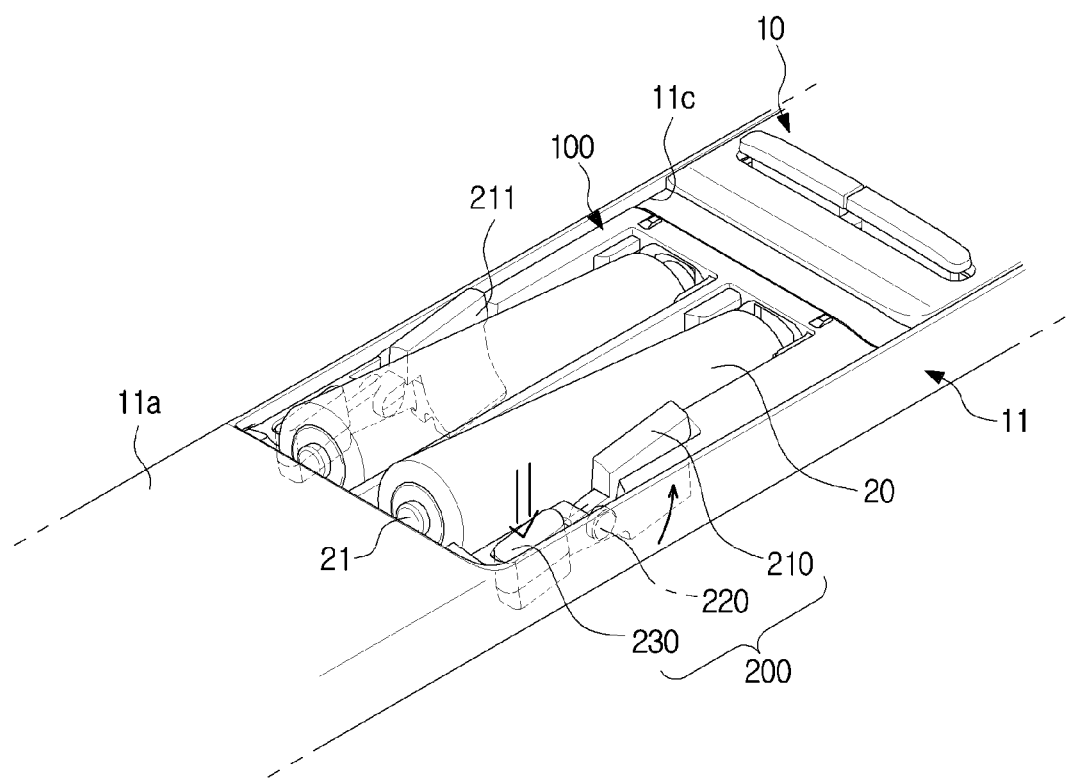
FIG. 6 is a view illustrating an operation of the batteries due to movement of the pressing members according to an exemplary embodiment.

FIG. 4 is an exploded perspective view illustrating a remote controller in which pressing members are installed in the battery container according to an exemplary embodiment, FIG. 5 is a perspective view illustrating the pressing members are installed in the battery container according to an exemplary embodiment, and FIG. 6 is a view illustrating an operation of the batteries due to movement of the pressing members according to an exemplary embodiment.

As shown in FIGS. 4 to 6, the battery container 110 in which the batteries 20 may be accommodated is provided in the battery case 100.

The battery container 110 may include a first battery container 110a in which the first battery 20a is accommodated, and a second battery container 110b in which the second battery 20b is accommodated.

Connection terminals 131 and 132 configured to come into contact with a positive electrode 21 (hereinafter, a first terminal) and a negative electrode 22 (hereinafter, a second terminal) of each of the batteries 20 may be provided on both sides of the battery container 110. The connection terminals 131 and 132 include the first connection terminal 131 connected to the first terminal 21 of the battery 20, and second connection terminal 132 connected to the second terminal 22. The second connection terminal 132 is provided to have elasticity. The first connection terminal 131 and the second connection terminal 132 are provided to be electrically connected to the printed circuit board of the body 10.

The connection terminals 131 and 132 are provided in the battery container 110 so that the batteries 20 may be disposed in the same direction. The first connection terminal 131 of the first battery container 110a and the first connection terminal 131 of the second battery container 110b may be disposed in the same direction. The first connection terminals 131 of the first battery container 110*a* and the second battery container 110*b* may be provided so that the first terminals 21 of the batteries 20 may be installed in the same direction. The first connection terminals 131 of the first battery container 110*a* and the second battery container 110*b* are disposed in a rear portion of the battery case 100. The second connection terminals 132 of the first battery container 110*a* and the second battery container 110*b* may be disposed in the same direction. The second connection terminals 132 of the first battery container 110*a* and the second battery container 110*b* may be disposed on a front portion of the battery case 100. As described above, the batteries 20 may be installed in the battery case 100 in the same direction due to the first connection terminals 131 and the second connection terminals 132 being provided in the battery case 100 in the same direction, and the pressing members 200, which will be described later, may be installed in the same direction. Although the examples of the first connection terminals 131 disposed on the rear portion of the battery case 100 and the second connection terminals 132 disposed on the front portion of the battery case 100 are illustrated, embodiments are not limited thereto. For example, the first connection terminals 131 may be provided on the front portion of the battery case 100, and the second connection terminals 132 may be provided on the rear portion of the battery case 100. The battery case 100 may include a partition 100*b* configured to partition the first battery container 110*a* and the second battery container 110*b*. The batteries 20 may be stably accommodated in the battery container 110 due to the partition 100*b*.

The pressing members 200 configured to press the batteries 20 when the batteries 20 are separated from the battery case 100 may be provided in the battery case 100. The pressing members 200 may be provided on edges 100*a* of the battery case 100 forming the battery container 110. Each of the pressing members 200 may be provided at one side of the edges 100*a* of the battery case 100. Although the examples of the pressing members 200 provided at outer sides of the first battery 20*a* and the second battery 20*b* is illustrated, embodiments are not limited thereto. For example, each of the pressing members may be disposed to press at least a part of the batteries.

The pressing members 200 may be disposed in parallel with the batteries 20.

The pressing members 200 may include pressers 210, rotary shafts 220, and buttons 230.

The pressers 210 and the buttons 230 are formed around the rotary shafts 220. The presser 210 is formed to extend from one side of the rotary shaft 220. The button 230 is formed to extend from another side of the rotary shaft 220. The presser 210 and the button 230 are formed to extend in different directions.

Accordingly, when the button 230 is pressed, the presser 210 is rotated around the rotary shaft 220 upward. However, when the button 230 returns to an original location thereof, the presser 210 is rotated around the rotary shaft 220 downward.

The presser 210 is provided to press at least one side surface of the battery 20. The presser 210 may have a curved surface 211 to come into contact with the battery 20. The presser 210 may have the curved surface 211 corresponding to an outer surface of the battery 20.

The button 230 may be provided to be pressed by a user. The button 230 may be disposed at a side opposite the presser 210 based on the center of the rotary shaft 220. The button 230 may include a predetermined contact surface to be pressed by the user.

Pressing member installers 120 configured to detachably mount the pressing members 200 may be provided in the battery case 100. The pressing member installers 120 may be provided in the battery container 110. The pressing member installers 120 may be formed on an inner surface of the battery container 110.

The pressing member installers 120 may include presser installers 121, rotary shaft supporters 123, and button installers 122.

The presser installer 121 is formed to accommodate the presser 210. The presser installer 121 is formed so that the presser 210 may be moved in a vertical direction.

The rotary shaft supporter 123 is formed to rotatably support the rotary shaft 220 of the pressing members 200. The rotary shaft supporter 123 is formed to be connected to the presser installer 121.

The button installer 122 is connected to the presser installer 121 and formed to accommodate the button 230. The button installer 122 is formed to be open so that the button 230 may be moved in the vertical direction.

Separation prevention parts 125 configured to prevent the pressing members 200 from being separated from the pressing member installers 120 may be formed in the pressing member installers 120. The separation prevention part 125 may be formed on a connection portion configured to connect the button installer 122 and the rotary shaft supporter 123. The separation prevention part 125 is formed to prevent the button 230 or the rotary shaft 220 from being separated from the pressing member installer 120.

The presser installer 121, the button installer 122, and the rotary shaft supporter 123 of the pressing member installer 120 may be integrally formed to be connected to each other.

The pressing members 200 may be detachably installed in the pressing member installer 120 of the battery case 100. A method of assembling the pressing member 200 into the pressing member installer 120 will be described below (see FIG. 5).

The button 230 of the pressing member 200 is inserted into the presser installer 121 of the pressing member installers 120.

In this case, the button 230 is moved toward a lower side of the rotary shaft supporter 123. The rotary shaft 220 of the pressing member 200 may be coupled to the rotary shaft supporter 123.

When the rotary shaft 220 is coupled to the rotary shaft supporter 123, the button 230 is positioned at the button installer 122 by rotating the pressing member 200, and the presser 210 is positioned at the presser installer 121 to be assembled.

Accordingly, when the batteries 20 are separated from the battery case 100 and when a user presses the button 230 of the pressing member 200, the button 230 is moved downward, and the presser 210 is rotated around the rotary shaft 220 to move upward.

The battery container 110 in which the batteries 20 are accommodated may be formed to correspond to specifications of the batteries 20. The battery 20 is disposed between the first connection terminal 131 and the second connection terminal 132 of the battery container 110 and is tightly supported by elasticity of the second connection terminal 132.

In this case, as shown in FIG. 6, for example, the presser 210 of the pressing member 200 presses the battery 20 to move at least a part of the battery 20 upward, and the battery 20 of which at least a part is moved may be easily separated from the battery container 110.

Accordingly, the user may separate the batteries 20 from the battery container 110 with a small amount of force.

Figure 7:
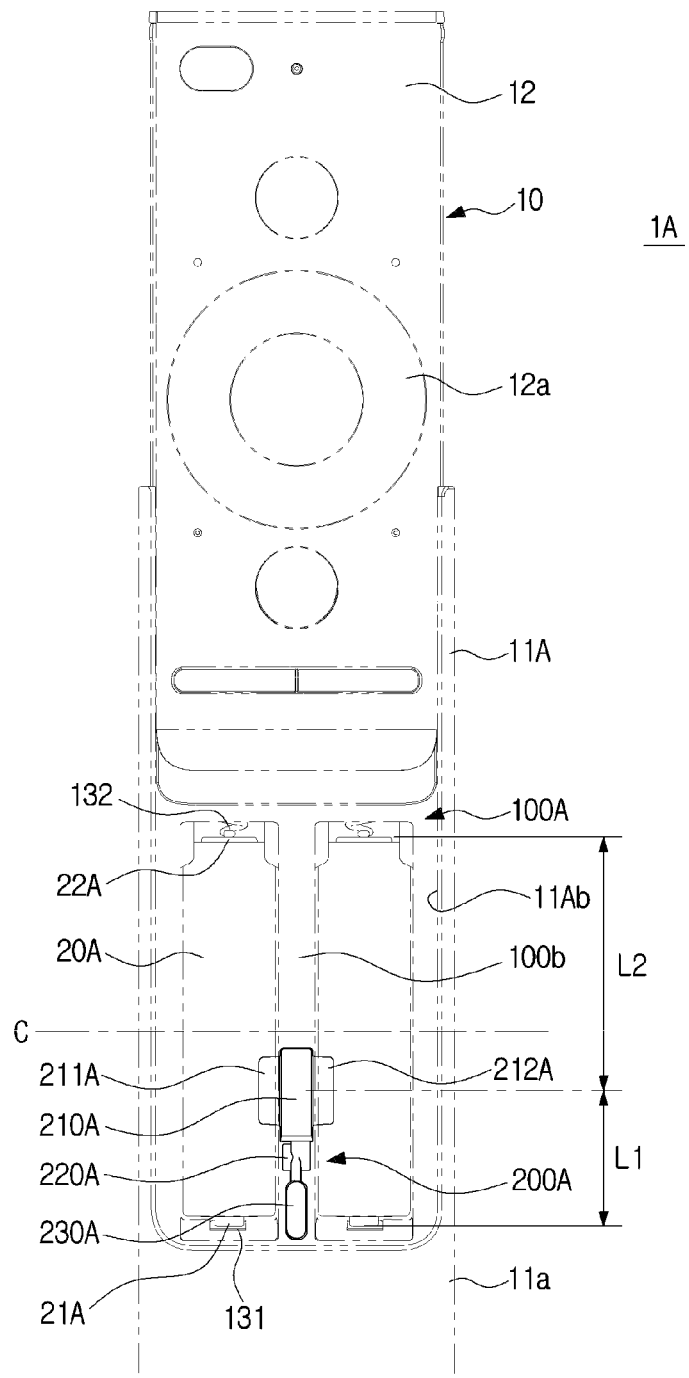
FIG. 7 is a view illustrating pressing members installed in the battery container according to another exemplary embodiment.

FIG. 7 is a view illustrating pressing members installed in battery container according to another exemplary embodiment. Reference numerals not shown may be understood with reference to FIGS. 1 to 6.

As shown in FIG. 7, a pressing member 200A is provided in a battery case 100A to press batteries 20A.

The pressing member 200A is installed in battery container 110 to press the batteries 20A when the batteries 20A are separated from the battery container 110.

The pressing member 200A may be disposed in the middle of the battery container 110 of the battery case 100A. The battery container 110 includes a first battery container 110a and a second battery container 110b. A partition 100b may be provided in the middle of the battery container 110. Each of the batteries 20A may be accommodated in one part of the battery container 110 due to the partition 100b.

The pressing member 200A may simultaneously press a first battery 20a accommodated in the first battery container 110a and a second battery 20b accommodated in the second battery container 110b.

The pressing member 200A may include a presser 210A, a rotary shaft 220A, and a button 230A.

The presser 210A is formed to extend from one side of the rotary shaft 220A. The button 230A is formed to extend from another side of the rotary shaft 220A. The presser 210A and the button 230A are formed to extend in different directions based on the center of the rotary shaft 220A.

Accordingly, the presser 210A is rotated around the rotary shaft 220A upward when the button 230A is pressed, and the presser 210A is rotated around the rotary shaft 220A downward when the button 230A returns to an original location thereof.

The presser 210A includes a first press surface 211A provided to press the first battery 20a and a second press surface 212A provided to press the second battery 20b.

The first press surface 211A and the second press surface 212A may be formed to oppose each other. The first press surface 211A and the second press surface 212A may be formed to have a curved surface.

A pressing member installer 120 may be formed at the center of the battery container 110 to install the pressing member 200A. The pressing member installer 120 may be formed on the partition 100b.

The pressing member 200A may be eccentrically disposed toward first connection terminals 131 with respect to the centers C of the first connection terminals 131 and second connection terminals 132 provided on both ends of the battery container 110.

A first distance L1 from the first connection terminal 131 to the pressing member 200A is shorter than a second distance L2 from the second connection terminal 132 to the pressing member 200A. That is, the pressing member 200A may be disposed relatively close to the first connection terminal 131. The presser 210A of the pressing member 200A configured to press the batteries 20A is disposed nearer the first connection terminal 131 than the second connection terminal 132.

The battery 20A may be easily moved when pressed at a location far away from the second connection terminal 132 configured to elastically support the batteries 20A accommodated in the battery container 110.

Overlapping descriptions of a specific configuration and operation of pressing member installers will be omitted.

Figure 8:
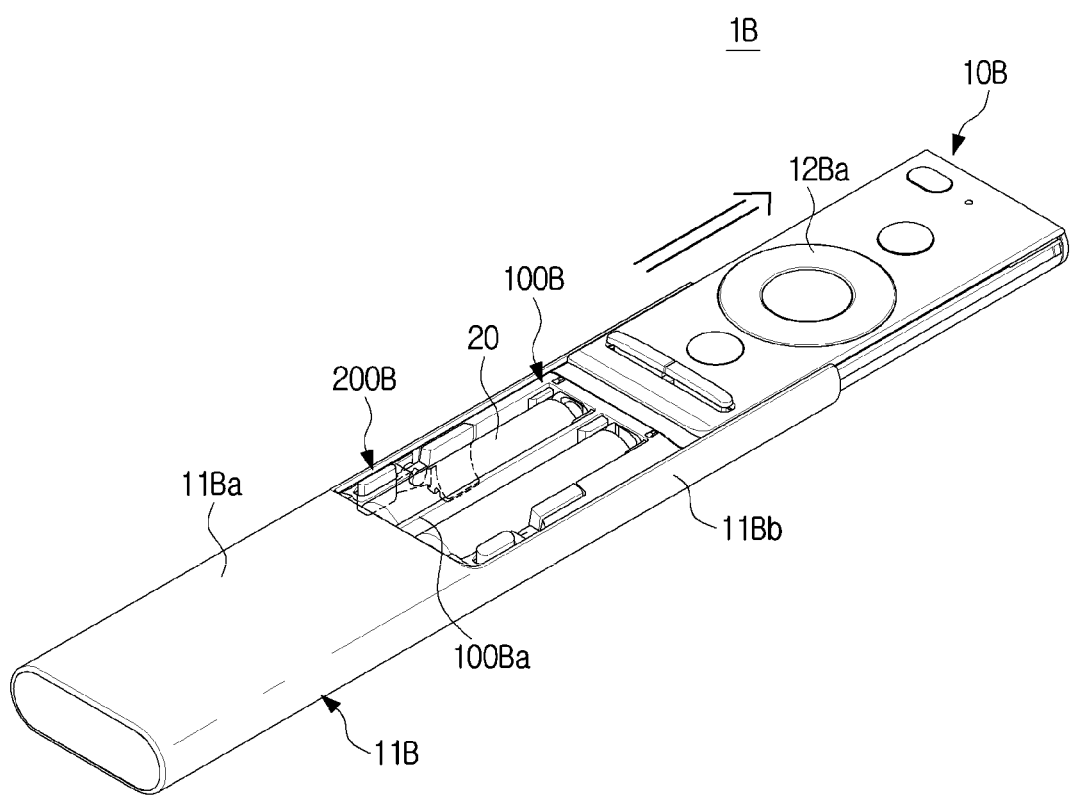
FIG. 8 is a perspective view illustrating a part of a remote controller in which pressing members are installed according to still another exemplary embodiment.
Figure 9:
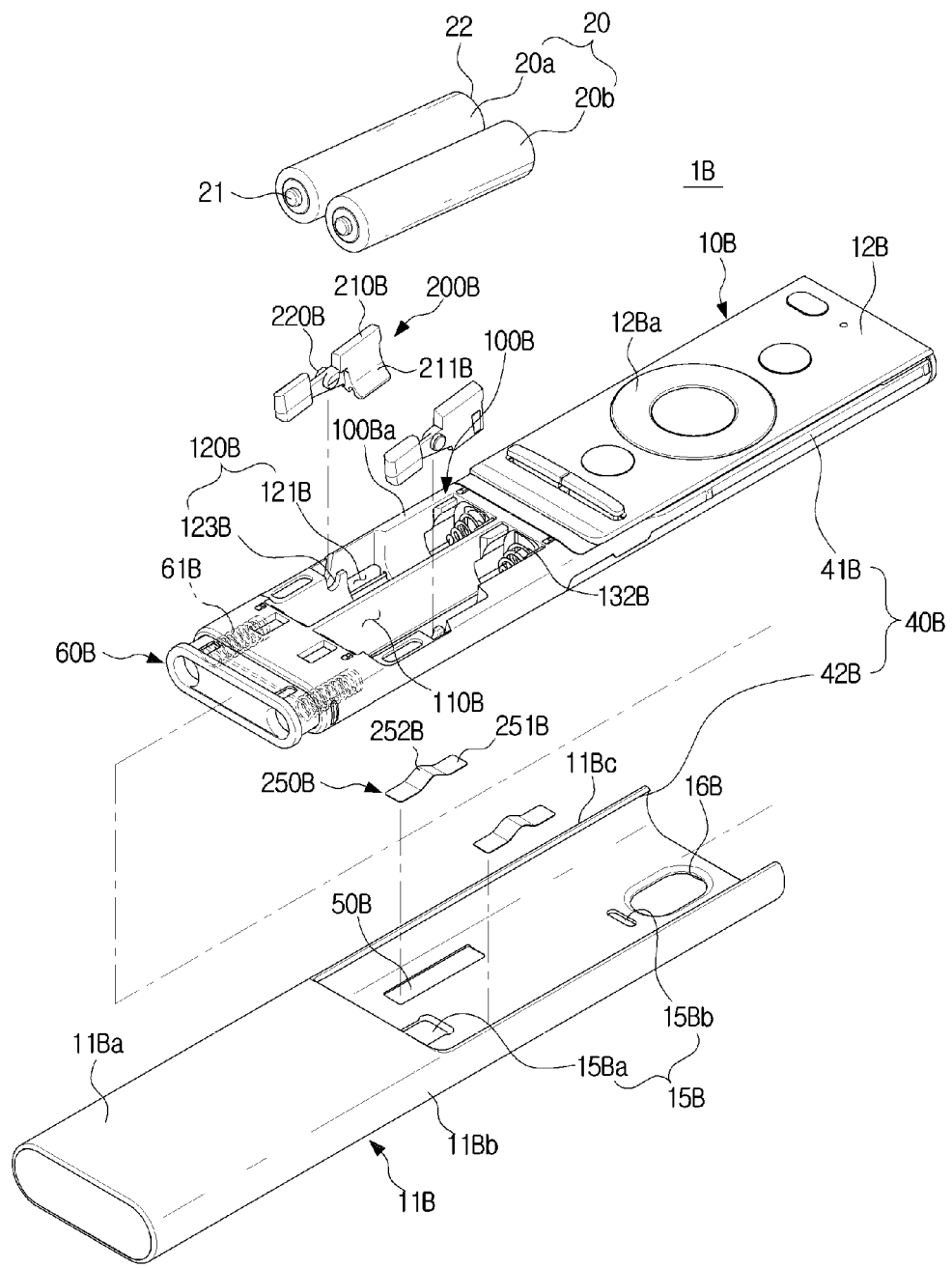
FIG. 9 is an exploded perspective view illustrating the remote controller in which the pressing members are installed according to still another exemplary embodiment.
Figure 10:
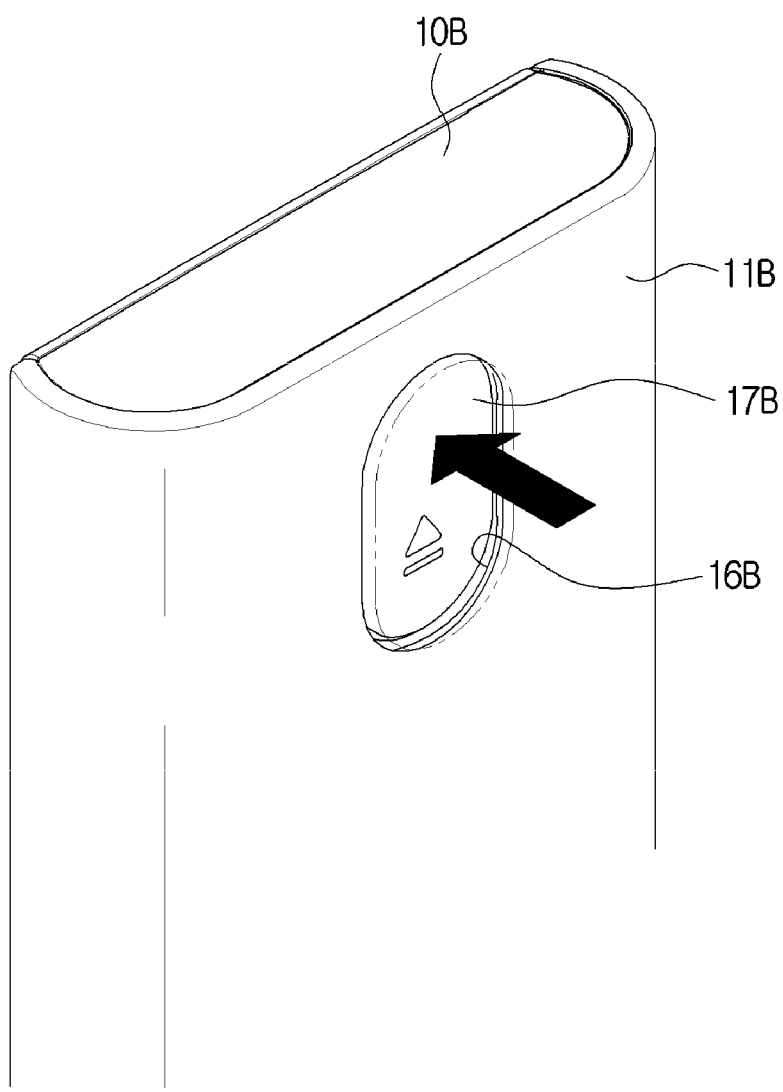
FIG. 10 is a perspective view illustrating a rear surface of the remote controller according to still another exemplary embodiment.
Figure 11:
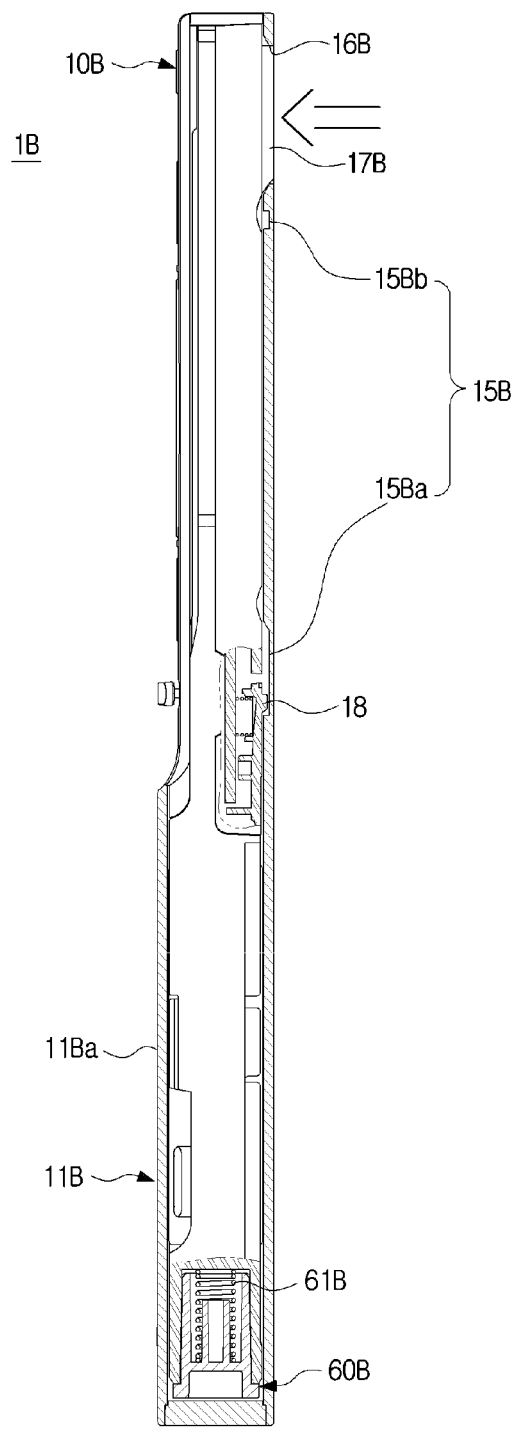
FIGS. 11 and 12 are views illustrating separation of the remote controller according to still another exemplary embodiment.
Figure 12:
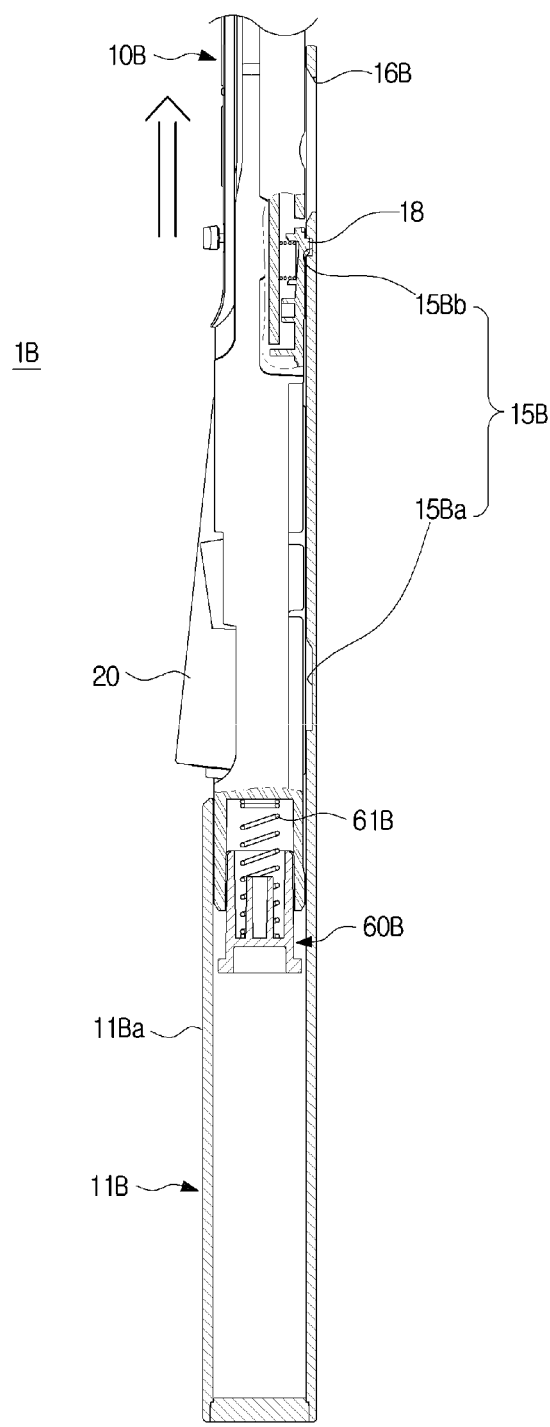
Figure 13:
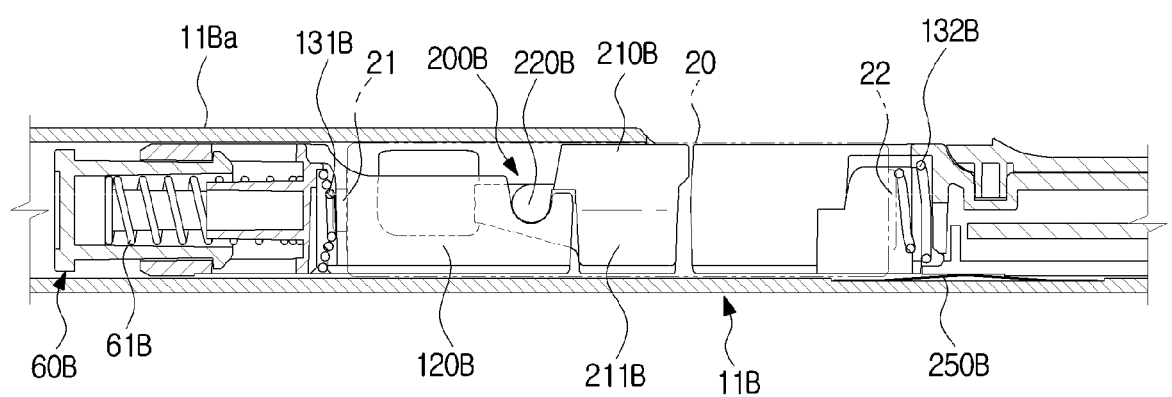
FIG. 13 is a view illustrating the pressing members installed in the battery container according to still another exemplary embodiment.
Figure 14:
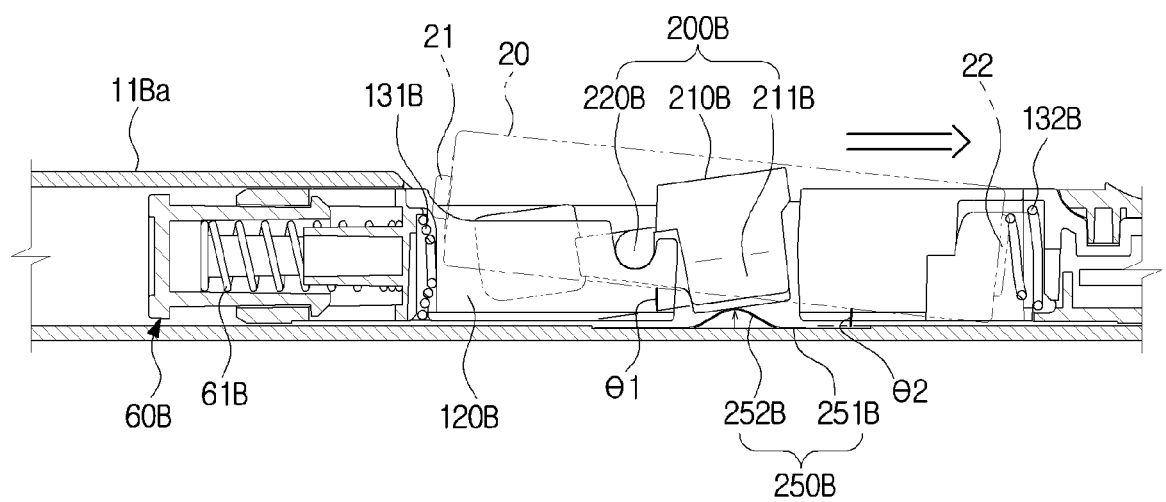
FIG. 14 is a view illustrating operation of the pressing members when a body of the remote controller is slidably opened according to still another exemplary embodiment.

FIG. 8 is a perspective view illustrating a part of a remote controller in which pressing members are installed according to still another exemplary embodiment, FIG. 9 is an exploded perspective view illustrating the remote controller in which the pressing members are installed according to still another exemplary embodiment, FIG. 10 is a perspective view illustrating a rear surface of the remote controller according to still another exemplary embodiment, FIGS. 11 and 12 are views illustrating separation of the remote controller according to still another exemplary embodiment, FIG. 13 is a view illustrating the pressing members installed in the battery container according to still another exemplary embodiment, and FIG. 14 is a view illustrating operation of the pressing members when a body of the remote controller is slidably opened according to still another exemplary embodiment. Reference numerals not shown may be understood with reference to FIGS. 1 to 6.

As shown in FIGS. 8 to 14, a remote controller 1B may include a battery case 100B including pressing members 200B.

The remote controller 1B may include a body 10B and a cover 11B to which the body 10B is slidably coupled. The cover 11B may include a first surface portion 11Ba forming a front surface thereof, and a second surface portion 11Bb forming both side surfaces and a rear surface thereof. The first surface portion 11Ba and the second surface portion 11Bb may be integrally formed.

The battery case 100B provided in a lower portion of the body 10B may be covered by the first surface portion 11Ba of the cover 11B.

The body 10B may be inserted into body installation portion 11B of the cover 11B to be attached to and detached from the cover 11B. The body 10B may be slidably coupled to the cover 11B through the body installation portion 11Bc.

As shown in FIG. 9, the body 10B and the cover 11B may be slidably moved through moving members 40B. The moving members 40B may include first rails 41B provided on both side surfaces of the body 10B and second rails 42B provided on both inner side surfaces of the cover 11B.

The first rails 41B may be formed to correspond to the second rails 42B. The first rail 41B may be guided by the second rail 42B to be moved.

A separation button 17B configured to separate the cover 11B is provided on the body 10B. The separation button 17B may be formed on a lower surface of the body 10B. The push type separation button 17B may be formed on the lower surface of the body 10B.

A separation hole 16B to which the separation button 17B is coupled may be formed in the cover 11B. The separation hole 16B may be formed at a location corresponding to the separation button 17B. When the separation button 17B is pushed toward an inside of the body 10B and separated from the separation hole 16B, the body 10B may be separated from the cover 11B.

In this case, an elastic supporter 60B may be provided on the body 10B such that the body 10B is easily separated from the cover 11B. The elastic supporter 60B may be installed on a lower end of the body 10B. The elastic supporter 60B may include an elastic body 61B provided therein. The elastic supporter 60B is provided so that the body 10B is supported by the cover 11B. The body 10B is elastically supported by a body container 10a of the cover 11B, and may be easily separated from the cover 11B.

Accordingly, when the separation button 17B of the body 10B is pressed, the body 10B is separated from the cover 11B and may be moved a predetermined distance from the cover 11B by the elastic supporter 60B.

As shown in FIG. 11, a hook protrusion 18 formed on a rear surface of the body 10B may be located at a central portion of the rear surface of the body 10B.

A hook part 15B formed to be engaged with the hook protrusion 18 of the body 10B may be provided in the cover 11B. The hook part 15B is provided to prevent the body 10B from being completely separated from the cover 11B.

The hook protrusion 18 of the body 10B is provided to be coupled to a first hook part 15Ba before the body 10B is separated from the cover 11B. The first hook part 15Ba may be elongated in a moving direction of body 10B. The hook protrusion 18 maintains a coupled state with the first hook part 15Ba when the body 10B is coupled to the cover 11B, and the hook protrusion 18 is moved along the first hook part 15Ba in an engaged state when the separation button 17B is pressed and the body 10B is separated from the cover 11B.

When a user pulls the body 10B to further move the body 10B, the hook protrusion 18 is engaged with a second hook part 15Bb.

Since the hook protrusion 18 of the body 10B is engaged with the second hook part 15Bb, the body 10B may be prevented from being completely separated from the cover 11B.

The battery case 100B may include a battery container 110B configured to accommodate batteries 20, pressing members 200B configured to press the batteries 20 accommodated in the battery container 110B, and elastic members 250B provided to move the pressing members 200B.

The pressing members 200B may include pressers 210B and rotary shafts 220B.

The presser 210B may include a press surface 211B having a curved surface shape to come into contact with and press one side surface of the battery 20. The presser 210B may be formed to extend from one side of the rotary shaft 220B. The presser 210B may be provided to be rotatable around the rotary shaft 220B. Although the example of the presser 210B including the rotary shaft 220B configured to support the presser 210B to be rotated and moved is illustrated, embodiments are not limited thereto. For example, the presser 210B may include the moving member 40B excluding the rotary shaft 220B.

Elastic members 250B may be disposed under the pressers 210B. The elastic member 250B may include at least one of a spring and a leaf spring having an elastic force.

The elastic members 250B may include uneven portions 252B and fixers 251B extending from the uneven portions 252B.

As shown in FIG. 9, the elastic members 250B may be installed on the cover 11B. Elastic member installers 50B on which the elastic members 250B may be installed may be formed in an inner surface of the cover 11B. The elastic member installer 50B may be formed to be recessed inward from the second surface portion 11Bb. The elastic member installer 50B may be formed at a location corresponding to the pressing member 200B of the battery container 110B. The elastic member installer 50B may be formed at a location corresponding to the presser 210B. The uneven portion 252B of the elastic member 250B installed on the elastic member installer 50B may be installed to be located at the location corresponding to the presser 210B. The fixer 251B of the elastic member 250B may be fixed to the elastic member installer 50B in a welding or bonding method.

Since the elastic member 250B moves the battery 20 upward from the battery container 110B using elasticity thereof, a user may easily separate the batteries 20 coupled to the battery container 110.

When the body 10B is slidably moved from the cover 11B to replace and separate the batteries 20, an upper surface of the battery container 110B may be exposed from the first surface portion 11Ba of the cover 11B.

When the body 10B is moved to a predetermined location (a location in which the hook protrusion 18 is engaged with the first hook part 15Ba) of the cover 11B the uneven portion 252B of the elastic member 250B installed on the elastic member installer 50B of the cover 11B moves the presser 210B upward.

As shown in FIG. 14, when the presser 210B is moved upward, the battery 20 accommodated in the battery container 110B is pressed by the presser 210B to be moved upward. In this case, a first movement angle $\theta 1$ of the presser 210B rotated and moved by elastic member 250B and a second movement angle $\theta 2$ of the battery 20 may be identical.

Accordingly, since the battery 20 is moved by the second movement angle $\theta 2$ when the body 10B is separated from the cover 11B, a user may easily separate the battery 20.

The connection terminals 131B and 132B are provided in the battery container 110B so that the batteries 20 may be disposed in the same direction. The first connection terminals 131B and the second connection terminals 132B of the battery container 110B may be disposed in the same direction. The first connection terminals 131B and the second connection terminals 132B may be provided so that first terminals 21 and second terminals 22 of the batteries 20 may be installed in the same direction. In this case, the first connection terminals 131B of the battery container 110B are disposed on a rear portion of the battery case 100B. The second connection terminals 132B may be disposed on a front portion of the battery case 100B. The second connection terminals 132B may be provided in the same direction as the movement of the body 10B.

The batteries 20 may be installed in the battery case 100B in the same direction due to the first connection terminals 131B and the second connection terminals 132B provided in the battery case 100B in the same direction.

In this case, since the second connection terminals 132B are provided in the battery case 100B in the same direction as the movement of the body 10B, sliding of the body 10B and the cover 11B may not be interfered with from the batteries 20 being pressed in the body 10B for replacement and separation of the batteries 20.

When the batteries 20 pressed by the pressing members 200B to be separated from the battery case 100B are separated from the battery container 110B of the battery case 100B, a user's force is applied to the second connection terminal 132B having elasticity, and, in this case, since the second connection terminals 132B are disposed in the same direction as the movement of the body 10B, the force applied by the user is applied in the same direction as a sliding direction of the body 10B and the cover 11B slide, and does not hinder the sliding of the body 10B and the cover 11B.

Figure 15:
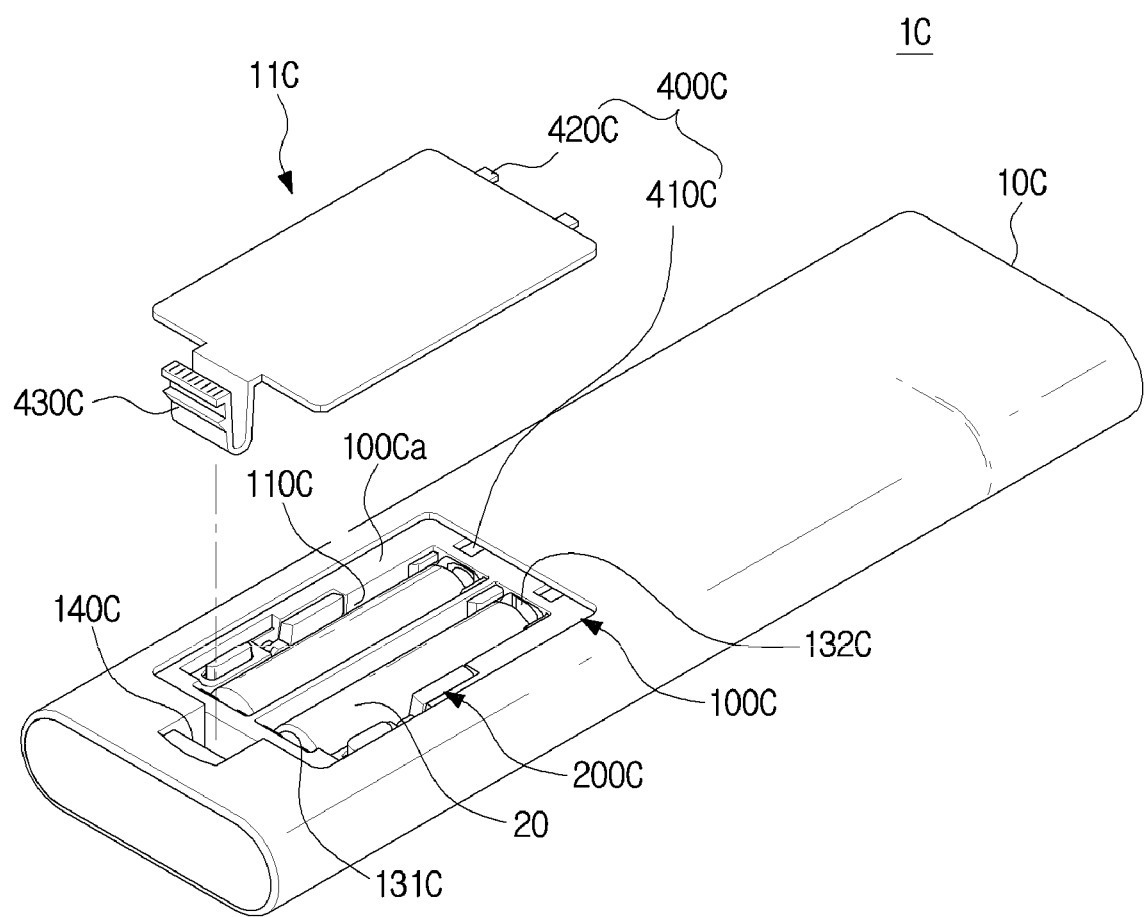
FIGS. 15 and 16 are views illustrating pressing members installed in the battery container of a remote controller according to yet another exemplary embodiment.
Figure 16:
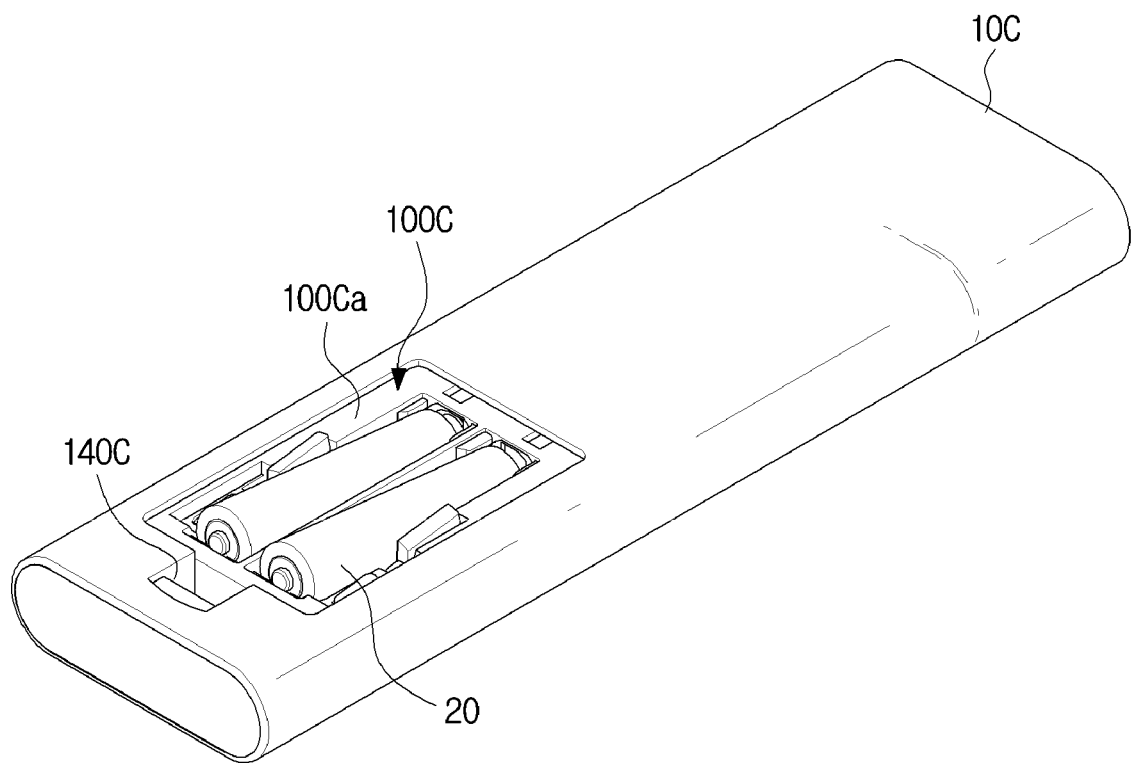

FIGS. 15 and 16 are views illustrating pressing members installed in battery container of a remote controller according to yet another exemplary embodiment.

As shown in FIGS. 15 and 16, a remote controller 1C may include a body 10C and a battery case 100C provided in at least a part of the body 10C.

The battery case 100C may be integrally formed to be recessed inward from a rear surface of the body 10C. The battery case 100 has an open upper surface, and a battery container 110C is provided in the battery case 100.

The battery container 110C may be covered by the cover 11C. The cover 11C may be coupled to an open surface of the battery container 110C. The cover 11C may be formed to have a size and shape corresponding to the battery container 110C.

The cover 11C may be formed of the same material as the body 10C. The cover 11C may include second couplers 420C and a hook 430C to be coupled to the body 10C.

Couplers 400C may include first couplers 410C provided in the battery case 100C of the body 10C and second couplers 420C formed on the cover 11C corresponding to the first couplers 410C. The first couplers 410C may include grooves formed to be recessed inward from one side of the battery container 110C. The second couplers 410C may include protrusions formed to protrude from one side of the cover 11C corresponding to the first couplers 410C.

Accordingly, the second couplers 420C of the cover 11C may be inserted into and coupled to the first couplers 410C of the battery container 110C.

The hook 430C may be provided on another side of the cover 11C. A hook groove 140C corresponding to the hook 430C may be provided in the battery container 110C. A user may separate the cover 11C from the body 10C by adjusting the hook 430C.

Pressing members 200C are provided in the battery case 100C to press the batteries 20 when the batteries 20 are separated from the battery container 110C. The pressing members 200C may be provided in edges 100a of the battery case 100C forming the battery container 110C. The pressing members 200 may be provided in the edges 100a of the battery case 100C.

Overlapping descriptions of the specific configuration and operation of the pressing member installers and the pressing members will be omitted.

As is apparent from the above description, batteries can be separated from a body, and thus, replacement of the batteries can be easily performed.

Further, batteries can be stably separated from a body by a user, and thus, usability of a remote controller can be improved.

Although a few exemplary embodiments have been shown and described, it should be appreciated by those skilled in the art that changes may be made to the embodiments without departing from the principles and spirit of the disclosure, and the scope of the disclosure is defined in the claims and their equivalents.

What is claimed is:

1. A battery case comprising:
a body including a battery container configured to accommodate a battery;
a pressing member installed in the battery container and configured to rotate about an axis intersection the battery to press the battery in response to the battery being separated from the body,
a cover configured to cover the battery container; and
an elastic body configured to press the body to move the body a predetermined distance away from the cover.

2. The battery case according to claim 1, wherein the pressing member is detachably installed, on at least one edge of the battery container.

3. The battery case according to claim 1, wherein the pressing member includes a presser configured to press at least one side of the battery.

4. The battery case according to claim 3, wherein the pressing member further includes a rotary shaft and a button part extending toward one side of the rotary shaft, and the presser is configured to be moved by pressing of the button part.

5. The battery case according to claim 1, wherein the body includes the cover configured to cover the battery container and an elastic member configured to move the pressing member in response to the cover being separated from the body.

6. The battery case according to claim 4, wherein the battery is a cylindrical battery, and
the presser includes a curved surface corresponding to the battery.

7. The battery case according to claim 4, wherein the battery container includes a pressing member installer on which the pressing member is detachably mounted.

8. The battery case according to claim 7, wherein the pressing member installer includes:
a presser installer configured to accommodate the presser;
a button part installer connected to the presser installer and formed to be open to accommodate the button part; and
a rotary shaft supporter configured to support the rotary shaft.

9. The battery case according to claim 8, wherein the pressing member installer further includes a separation prevention part configured to prevent separation of the pressing member.

10. The battery case according to claim 5, wherein the battery container includes a first connection terminal configured to come into contact with one end of the battery, and a second connection terminal configured to come into contact with another end of the battery, the second connection terminal having elasticity.

11. The battery case according to claim 10, wherein the pressing member is disposed nearer the first connection terminal than the second connection terminal.

12. A remote controller comprising:
a body including a battery container configured to accommodate a battery;
a case configured to cover the battery container;
a pressing member installed in the battery container and configured to rotate about an axis intersecting the battery to press the battery in response to the case being separated from the body, and
an elastic body configured to press the body to move the body a predetermined distance away from the case.

13. The remote controller according to claim 12, wherein the body is configured to slide from the case.

14. The remote controller according to claim 13, wherein the battery container includes an elastic member configured to move the pressing member.

15. The remote controller according to claim 12, wherein the pressing member includes:
a rotary shaft;
a button part extending toward one side of the rotary shaft; and
a presser extending to another side of the rotary shaft and configured to be moved by the button part.

16. The remote controller according to claim 15, wherein the battery is a cylindrical battery, and
the presser includes a contact surface in a curved surface shape corresponding to the battery.

17. The remote controller according to claim 16, wherein the pressing member is detachably installed on at least one edge of the battery container.

18. The remote controller according to claim 17, wherein the battery container includes a pressing member installer on which the pressing member is detachably installed, and the pressing member installer includes a separation prevention part configured to prevent separation of the pressing member.

19. The remote controller according to claim 17, wherein the battery container further includes:
- a first connection terminal configured to come into contact with a first end of the battery; and
- a second connection terminal configured to come into contact with a second end of the battery and having elasticity.

20. The remote controller according to claim 19, wherein the presser is disposed nearer the second connection terminal than the first connection terminal.

* * * * *